AUTOMATIC SIGNAL INPUT PHASER

Filed April 2, 1956 2 Sheets-Sheet 1

*INVENTOR.*
H. W. KAUFMANN
BY
Charles C. English
AGENT

Nov. 17, 1959 H. W. KAUFMANN 2,913,595

AUTOMATIC SIGNAL INPUT PHASER

Filed April 2, 1956 2 Sheets-Sheet 2

INVENTOR.
H. W. KAUFMANN
BY
Charles C. English
AGENT 2,913,595

AUTOMATIC SIGNAL INPUT PHASER

Henry W. Kaufmann, Mount Clare, Pa., assignor to Sperry Rand Corporation, New York, N.Y., a corporation of Delaware Application April 2, 1956, Serial No. 575,493

16 Claims. (Cl. 307—88)

The present invention relates to devices capable of accepting mixed phase input signals and rephasing the said signals to provide a single phase output therefrom; and is more particularly concerned with such devices adapted for use as input circuits with pulse type amplifiers, for instance of the magnetic type.

In systems employing pulse type magnetic amplifiers, the input pulses applied to such amplifiers must ordinarily be applied at a time when energizing power pulses associated with the said amplifier are of a predetermined polarity. Reference is made to Steagall U.S. Patent No. 2,709,798, issued May 31, 1955, for "Bistable Devices Utilizing Magnetic Amplifiers," which patent teaches both complementing and noncomplementing magnetic amplifiers of the pulse type energized by a source of spaced power pulses, and cooperating with input pulses also of the pulse type. As has been discussed in the said Steagall patent, such a pulse type amplifier requires the input pulse to occur during a preselected polarity excursion of the power pulse, and in the particular examples discussed by Steagall, the input pulses should occur during negative-going excursions of the power pulse source.

In the precise disposition of components comprising an over-all magnetic amplifier system, some amplifiers may be fed by "phase A power pulses" while other of the amplifiers may utilize "phase B power pulses." This terminology, in each instance, merely refers to power pulses which are positive and negative-going in time with respect to an arbitrary datum, with the phase A power pulses being so displaced with respect to phase B power pulses that a positive-going portion, for instance of a phase A power pulse, coincides with a negative-going portion of a phase B power pulse, and vice versa.

When systems are constructed utilizing such magnetic amplifiers, and it is desired that the output of one such amplifier is to be used to drive another such amplifier, it is ordinarily convenient to supply the said cascade-connected amplifiers with power pulses in phase opposition to one another. A typical such arrangement is illustrated, for instance in Figure 7 of the above identified Steagall patent. When such an arrangement is used, the output of an amplifier driven by phase A power pulses will normally occur at a proper time to provide an appropriate signal input to a subsequent amplifier driven by phase B power pulses, and vice versa. In practice, however, it has been found that, in a number of systems, varying switching paths may be provided, and such varying paths may cause a signal output from an amplifier driven by a given phase output pulse to arrive at the input of another amplifier driven by the same phase power pulse. When this occurs, the input to the second amplifier cannot effect an appropriate output response from that amplifier, and to assure proper operation of the said second amplifier stage, the input pulse thereto must be delayed by half a pulse period, i.e., one pulse width.

The present invention is primarily concerned with novel circuits, particularly adapted to be coupled ot the input of pulse type magnetic amplifiers, for instance of the type set forth in Steagall Patent No. 2,709,798, which input circuits positively determine, and automatically assure, that a correct phase input pulse will be applied to the said amplifier regardless of the particular phase of pulse appearing at the output of a previous amplifier stage.

It is accordingly an object of the present invention to provide a novel signal input phaser.

Another object of the present invention resides in the provision of an input circuit for pulse type magnetic amplifiers which assures the proper phase of input signal to the said amplifier under all possible operating conditions.

A still further object of the present invention resides in the provision of a switching network adapted to receive, at its input, pulses of varying phase, and further adapted to provide, at its output, pulses of a single preselected phase only.

Still another object of the present invention resides in the provision of an input circuit for magnetic amplifiers, particularly of the pulse type, which automatically passes or delays pulses propagated toward the input of the said amplifier thereby to assure that a properly phased input will always be applied to the said amplifier.

A further object of the present invention resides in the provision of an improved signal phaser, and in particular, in the provision of an improved input circuit for pulse type magnetic amplifiers, which is more rugged in configuration and less subject to operating failures than has been the case heretofore.

Still another object of the present invention resides in the provision of an automatic signal phaser which may be made in relatively small sizes.

In providing for the foregoing objects and advantages, the present invention comprises a signal phaser or switching network which includes a pair of switching paths disposed substantially in parallel to one another. Each of the said switching paths includes a gating device; and one of the said switching paths further includes a delay circuit in series with its associated gating device. The aforementioned switching paths are coupled at one of their ends to a common input line adapated to receive pulse type signals which may be of either of two possible phases, and the gating devices in each of the said switching paths are periodically enabled by spaced pulse sources whereby input pulses of a first phase may be coupled through one of the said switching paths to the other end thereof, while input pulses of a second and opposite phase may be coupled to the other end of the other of said switching paths after an appropriate delay. The said other end of the said switching paths are further coupled to one another and to a common output line whereby, through the above described operation, the pulses which appear at the said output line are always of a single preselected phase regardless of the particular phase of input pulse applied to the switching network. When a switching network of the type described is utilized as an input circuit for a pulse type magnetic amplifier, therefore, the said magnetic amplifier always receives properly phased input signals regardless of the particular operating times of other amplifiers or of other stages in the system.

The foregoing objects, advantages, construction and operation of the present invention will become more readily apparent from the following description and accompanying drawings, in which.

Figure 1:
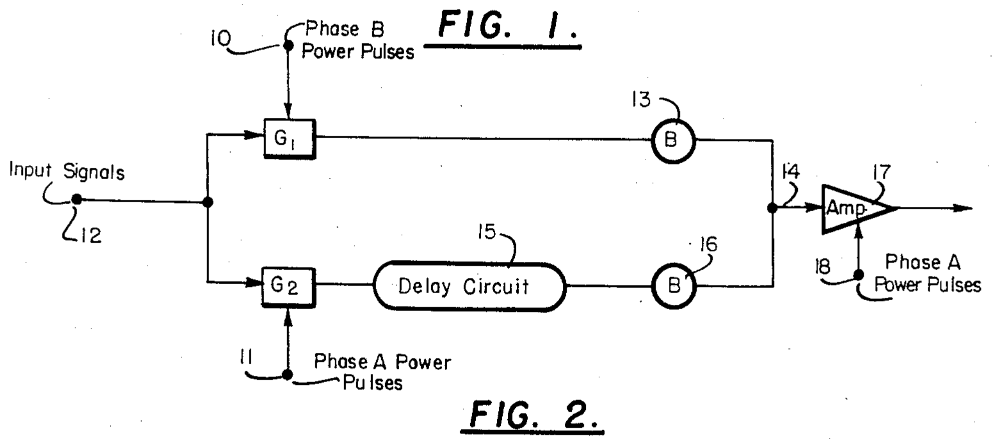
Figure 1 is a logical diagram of an automatic signal phaser constructed in accordance with one embodiment of the present invention.
Figures 2, 3:
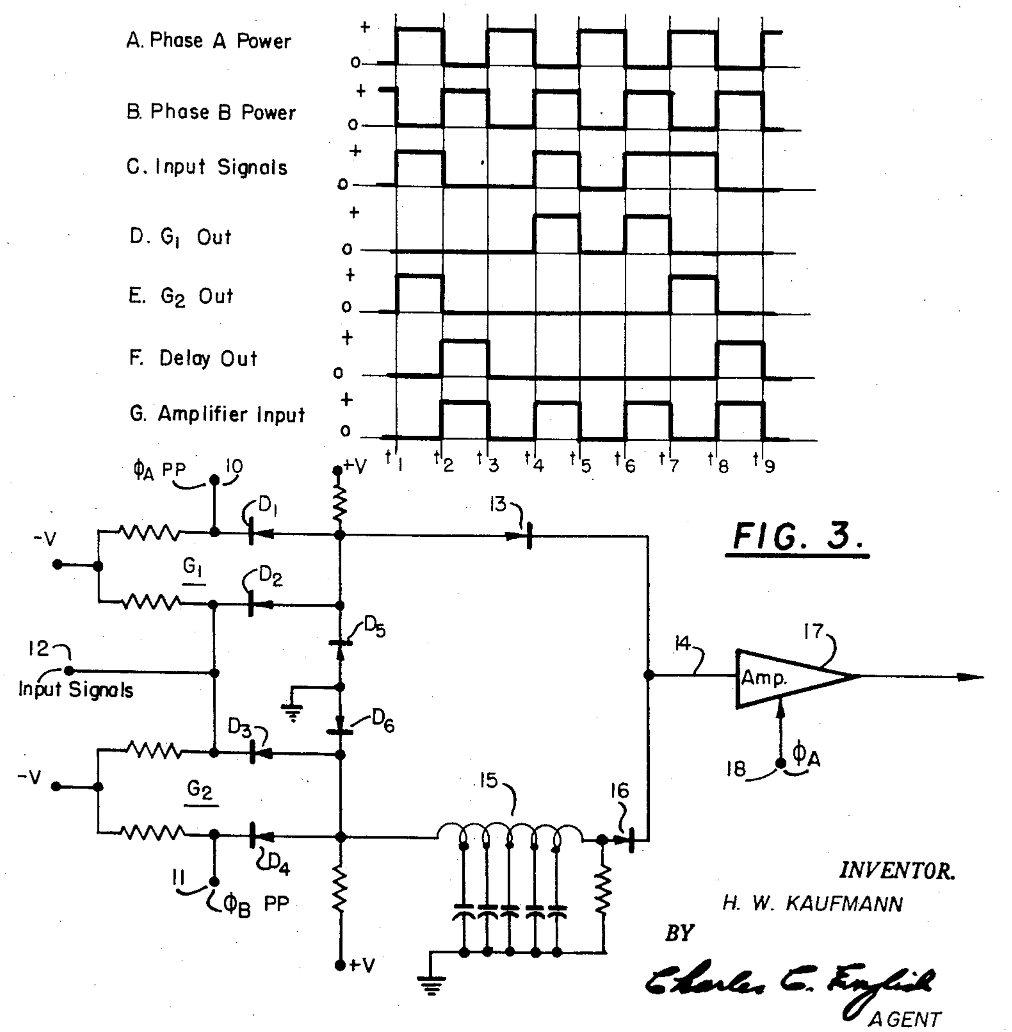
Figure 2 (A through G) are waveform diagrams illustrating the operation of the circuit shown in Figure 1.
Figure 3 is a schematic diagram showing one possible construction of the circuit illustrated in Figure 1.

Referring now to Figure 1 it will be seen that, in accordance with the present invention, an automatic signal phaser or input circuit for use with magnetic amplifiers of the pulse type may comprise a pair of gates G1 and G2 energized, respectively, by a source 10 of phase B power pulses (Figure 2B), and by a source 11 of phase A power pulses (Figure 2A). The sources 10 and 11 each provide trains of spaced pulses displaced in phase with respect to one another and the said sources 10 and 11 may comprise plural pulse sources, or a single pulse source with appropriate delay means interposed between the output thereof and one of the gate inputs. The power pulses have further been assumed, in Figure 2, to be positive-going from a base level of ground potential; but it should be understood that these power pulses may in fact be power pulses utilized with magnetic amplifier stages of the system whereby they may exhibit negative-going pulse portions as well.

The gates G1 and G2 each have one input terminal thereof coupled to a common source of input signals 12; and these input signals may, in accordance with the preceding discussion, be of either phase A (i.e. coinciding with a negative-going excursion of a phase A power pulse) or of phase B (i.e. coinciding with a negative-going portion of a phase B power pulse), depending upon external operating conditions in an over-all system. The output of gate G1 is coupled via a buffer 13 to an output line 14; and the output of gate G2 is coupled via a delay circuit 15 and buffer 16 to the same output line 14.

Delay circuit 15 exhibits a delay substantially equal to one-half a pulse period, i.e. one pulse width, whereby the over-all switching network assures that pulses of a single phase only appear on line 14. Line 14 may be coupled to the input of an amplifier 17, for instance of one of the types shown in the aforementioned Steagall patent; and with the particular arrangement of pulse sources shown in Figure 1, the pulses appearing on line 14 are always of phase A, as will be described, whereby the said amplifier 17 is assumed to be energized at a terminal 18 by a source of phase A power pulses. It will be appreciated that this representation is illustrative only, and by reversing the phase of pulses applied to the terminals 10 and 11, only phase B pulses will appear on line 14, whereby the said amplifier 17 may be energized at terminal 18 by phase B power pulses.

The operation of the system shown in Figure 1 will become more readily apparent from a consideration of the waveforms shown in Figure 2. Figures 2A and 2B illustrate respectively the phase A and phase B power pulses discussed previously; and Figure 2C depicts an assumed sequence of input pulses which might occur at input terminal 12. In particular, Figure 2C has assumed that the said input pulses take the form of phase B input pulses occurring during the time intervals *t1* to *t2*, and *t7* to *t8*; and phase A input pulses occurring during the time intervals *t4* to *t5* and *t6* to *t7*.

Examining the operation in detail, it will be seen that the phase B input pulse occurring during time interval *t1* to *t2* may be applied, during the said time interval, to one input of each of permissive gates G1 and G2. Inasmuch as gate G1 is energized by the negative-going portion of a phase B power pulse during the said time interval *t1* to *t2*, the said input signal during this particular time interval cannot pass via the said gate G1. Gate G2 is, however, enabled during the time interval *t1* to *t2* by the application of a positive-going phase A power pulse applied thereto, whereby the input pulse occurring during time interval *t1* to *t2* passes through gate G2 during this time interval (Figure 2E). The pulse so propagated through gate G2 is thereafter applied to delay circuit 15, whereby the said delay circuit produces an output pulse during the time interval *t2* to *t3* (Figure 2F); and this latter pulse is thereafter coupled via buffer 16 and line 14 to the input of amplifier 17 (Figure 2G). Thus, the phase B input pulse, which originally occurred during the time interval *t1* to *t2*, is delayed and thereafter applied to the amplifier during the time interval *t2* to *t3* whereby the actual pulse appearing at the input of amplifier 17 is a phase A input pulse, as is required by the power pulse energization supplied to the terminal 18 of the said amplifier.

If the next subsequent input pulse appearing at terminal 12 should occur, for instance during the time interval *t4* to *t5* (a phase A input pulse), this particular input pulse cannot pass via gate G2 since the said gate G2 is closed during time interval *t4* to *t5*; but the input pulse is passed via enabled gate G1 and is applied thereafter via buffer 13 and line 14 to the input of amplifier 17. Thus, for the particular arrangement shown, phase A input pulses immediately pass via the upper branch of the switching network, shown in Figure 1, to the input of the amplifier. Analogous operation occurs for the successively appearing phase A and phase B power pulses illustrated during the time interval *t6* to *t8* in Figure 2C.

As will be seen from an examination of Figure 2G, the amplifier input pulses which actually appear on line 14 always exhibit a phase A (i.e. they occur during negative-going excursions of, and can effectively cooperate with, phase A power pulses); and this output of the switching network is achieved by causing possible phase A inputs to that switching network to be immediately switched via the upper branch of the network to line 14, while possible phase B inputs are switched and delayed by the lower branch of the network. Thus, regardless of the phase of input signals appearing at terminal 12, a single predetermined phase of output signal always appears on line 14.

The particular gates, delay circuits and buffers illustrated in Figure 1 may, of course, assume a number of configurations known in the art, and the gates may for instance comprise diode gates, magnetic gates, or the other forms of gating devices known heretofore. A diode gate embodiment of the present invention has been illustrated in Figure 3; and this particular representation conforms to the logical circuit shown in Figure 1, with corresponding elements being given like designation. Gate G1, for instance, may comprise diodes D1 and D2 in combination with the associated impedances and potential sources illustrated; and similarly, gate G2 may comprise diodes D3 and D4, again with the associated components, impedances, and potential sources illustrated. A pair of ground clamp diodes D5 and D6 are also provided, although these are optional in nature. The particular delay circuit 15, shown in Figure 3, takes the form of a lumped element delay line; and again other forms of delay circuits may be utilized if desired. The over-all operation of the individual components shown in Figure 3 is well known to those skilled in the art.

The particular embodiment shown in Figure 1 utilizes different phased pulse sources associated with the gating devices in the upper and lower branches of my switching network. By reversing the interconnection of delay circuit and gating device in the lower one of the branches, however, a single phase control source may be utilized for both gating devices. Thus, referring to Figure 4, it will be seen that a switching or input network, in accordance with the present invention, may again comprise a pair of circuit paths, each of which includes a permissive gating device such as G3 and G4; and one of the said gating devices, G4, is again connected in series with a delay circuit 20. In the particular example illustrated in Figure 4, delay circuit 20 is disposed adjacent the input of gate G4 rather than adjacent the output of gate G4, and this change in disposition permits both of gates G3 and G4 to be energized by the same phase power pulse (phase B in the particular example shown). As before, one end of each of the switching networks is coupled to a source 21 of randomly phased input signals, and the other ends of the said circuit paths are coupled via buffers 22 and 23 to common output line 24.

Figure 4:
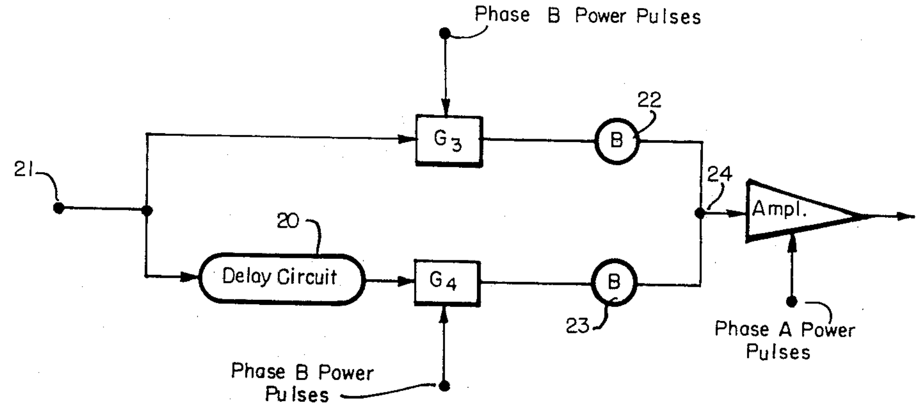
Figure 4 is a logical diagram of an automatic signal input phaser constructed in accordance with another embodiment of the present invention.
Figure 5:
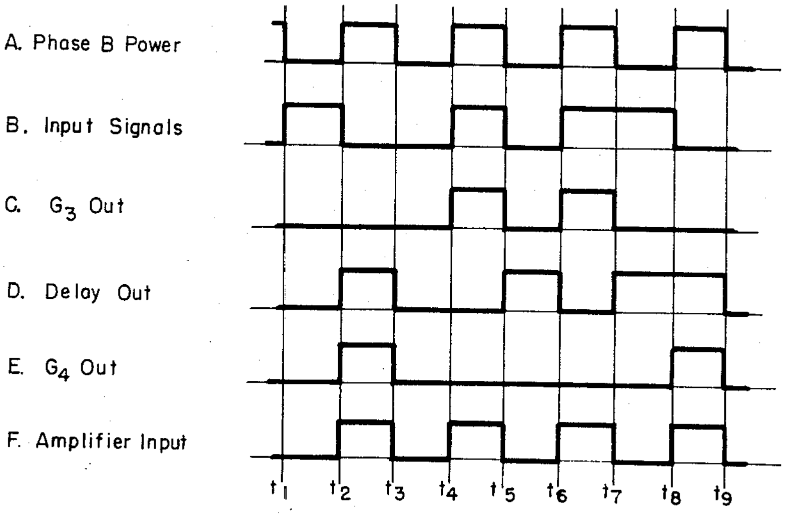
Figure 5 (A through F) are waveform diagrams illustrating the operation of the circuit shown in Figure 4.

Referring now to the waveforms shown in Figure 5, it will be seen that the device shown in Figure 4 functions in essentially the same manner as the device shown in Figure 1, in that randomly phased input signals appearing at terminal 21 (see Figure 5B, which has assumed the same input signal configuration as Figure 2C) appear as output pulses of the same phase on the output line 24 (Figure 5F). The operation of the circuit shown in Figure 4 is believed to be readily apparent from the waveforms illustrated in Figure 5.

While I have described preferred embodiments of the present invention, many variations will be suggested to those skilled in the art, and certain of these variations have already been discussed. Still further modifications will be readily apparent, however, and it must therefore be stressed that the foregoing description is meant to be illustrative only and should not be considered limitative of my invention. All such variations as are in accord with the principles described are meant to fall within the scope of the appended claims.

Having thus described my invention, I claim:

1. A signal phaser comprising first and second gating means, each of which has a first and a second input control terminal, means simultaneously coupling input pulse signals to said first terminals, means coupling first control signals to one of said second terminals during first predetermined time intervals, means coupling second control signals to the other of said second terminals during second predetermined time intervals different from and interlaced with said first time intervals, delay means in series with the output of said first gating means, and means coupling the outputs of said delay means and of said second gating means to a common output point.

2. A signal input phaser comprising first and second gating means, each of said gating means having a first and a second control terminal, delay means in series with said first gating means, means coupling input pulse signals simultaneously to said series connected first gating means and delay means and to said second gating means whereby said input signals are coupled to the first control terminals of both said gating means, means coupling regularly spaced control pulses to one of said second terminals, means coupling regularly spaced control pulses to the other of said second terminals, whereby said first and second gating means are enabled during regularly spaced time intervals, each of said input signals occurring during one of said time intervals and the width of each of said input signals being no greater than the duration of said spaced time intervals whereby each said input signal passes through one only of said gating means in dependence upon the phase of said input signal, and means coupling the output of said series connected first gating means and delay means and the output of said second gating means to a common output point whereby the signals appearing at said common output point are of a single predetermined phase.

3. The combination of claim 2 wherein said input pulses are coupled to the said first control terminal of said first gating means, the output of said first gating means being coupled via said delay means to said common output point, the control pulses coupled to the second control terminal of said first gating means being spaced to occur during time intervals interlaced with the occurrence of the control pulses coupled to the said second control terminal of said second gating means.

4. The combination of claim 2 wherein said input pulses are coupled to the said first control terminal of said first gating means via said delay means, the control pulses coupled to the said second control terminal of said first gating means being spaced to occur synchronously with the control pulses coupled to said second control terminal of said second gating means.

5. A signal input phaser comprising first and second circuit paths disposed in parallel to one another, said first circuit path comprising first gating means, said second circuit path comprising second gating means connected in series with a delay circuit, control means coupled to said gating means for periodically enabling said first and second gating means during predetermined regularly spaced time intervals, a source of input pulse signals coupled to one end of both said circuit paths, the occurrence of each of said input pulse signals being confined to one of said spaced time intervals whereby each said input pulse signal appears at the output of one only of said gating means in dependence upon which of said gating means is enabled when said input pulse signal appears at the inputs of said first and second gating means in said first and second circuit paths, and means coupling the other ends of both said circuit paths to a common output point.

6. The combination of claim 5 including a pulse type magnetic amplifier having its input coupled to said common output point.

7. The combination of claim 6 wherein said control means comprises a pulse source of a first phase coupled to said first gating means and a pulse source of a second phase coupled to said second gating means, said magnetic amplifier being energized by power pulses of said second phase, said pulses of said first and second phases being respectively interlaced with one another.

8. The combination of claim 6 wherein said control means comprises a control pulse source of a first phase coupled to each of said first and second gating means, said magnetic amplifier being energized by power pulses of a second phase whereby said power pulses occur during time intervals interlaced with said control pulses.

9. A signal input phaser comprising first and second circuit paths, said first circuit path comprising first gating means, said second circuit path comprising second gating means in series with a delay circuit, pulse control means coupled to said first and second gating means for enabling both said gating means during regularly spaced time intervals of preselected duration, said delay means exhibiting a time delay to the propagation of a pulse therethrough substantially equal to said preselected duration, and means simultaneously coupling input pulses having widths no greater than said preselected duration to one end of each of said first and second circuit paths whereby each of said input pulses passes via a selector one only of said first and second gating means and appears at the other ends of said circuit paths during a time interval determined by said pulse control means.

10. The combination of claim 9 including buffer means for coupling the said other ends of both said circuit paths to a common output terminal.

11. The combination of claim 9 wherein said pulse control means comprises means applying simultaneously occurring spaced control pulses to both said first and second gating means.

12. The combination of claim 9 wherein said pulse control means comprises means applying first spaced control pulses to said first gating means, and means applying second spaced control pulses to said second gating means, said first and second spaced control pulses being interlaced in time with one another.

13. A signal phaser comprising first and second permissive gates, means simultaneously coupling input signals to each of said gates, first control means selectively opening said first gate during first predetermined time intervals, second control means selectively opening said second gate during second time intervals different from said first time intervals, delay means coupled to the output of said first gate, said delay means having a time delay substantially equal to one of said time intervals whereby said input signals appear at the outputs of either said delay means or said second gating means during said second time intervals.

14. In combination, a pulse type amplifier, means for energizing said amplifier during regularly occurring spaced time intervals, said amplifier including input means cooperating with said energizing means and responsive to input pulses coupled thereto during fixed time intervals for producing a characteristic amplifier output, a source of input pulses producing pulses during said fixed time intervals as well as other pulses during other time intervals, signal phaser means coupling said source to said input means thereby to assure that input pulses from said source are coupled to said input means during said fixed time intervals only, said signal phaser means comprising a first circuit path having a first gate therein and a second circuit path having a series connected second gate and delay means therein, said first and second circuit paths being connected in parallel with one another between said input pulse source and said amplifier input means, and means for enabling both said gates during regularly spaced time intervals related to said amplifier energization time intervals.

15. A signal phaser comprising an input terminal and an output terminal, means for applying signals of a first and second phase to said input terminal, first and second circuit paths connected in parallel with each other and in series between said input terminal and said output terminal, said second circuit path including a delay circuit, said paths including gating means interposed in series with said first and second paths, said gating means being responsive to control signals for enabling the passage of input signals of a first phase through said first circuit path and input signals of a second phase through said second circuit path, said delay circuit having a delay period corresponding to the period between said first and second phase input signals, and means for regularly applying control signals to said gating means.

16. A signal phaser comprising an input terminal and an output terminal, first and second circuit paths connected in parallel with each other and in series between said input terminal and said output terminal, said paths include gating means connected to said output terminal, said second path including a delay circuit of a certain delay period connected between said input terminal and said gating means, means for applying input signals of first and second phases to said input terminal, said second phase leading said first phase by said delay period, and a source of periodic control signals of fixed phase coupled to said gating means for enabling the passage of said first phase input signals through said first path and said second phase input signals through said second path, whereby the signals produced at said output terminal in response to signals of different phase at said input terminal have the same phase relation to said first phase signals.

References Cited in the file of this patent

UNITED STATES PATENTS

| | | |
|---|---|---|
| 2,610,790 | Elliot | Sept. 16, 1952 |
| 2,709,798 | Steagall | May 31, 1955 |
| 2,763,778 | Gleason | Sept. 18, 1956 |